(12) United States Patent
Kaliavaradhan et al.

(10) Patent No.: US 10,776,369 B2
(45) Date of Patent: Sep. 15, 2020

(54) SYSTEMS AND METHODS OF SHARING A DATABASE ACROSS MULTIPLE DEPLOYMENTS AND SERVICES

(71) Applicant: Citrix Systems, Inc., Fort Lauderdale, FL (US)

(72) Inventors: Sathishkumar Kaliavaradhan, Pompano Beach, FL (US); Amit Shah, Palm Beach Gardens, FL (US); Steven Keller, Coral Springs, FL (US); Xiaodong Huang, Coral Springs, FL (US); Ayush Jain, North Lauderdale, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 184 days.

(21) Appl. No.: 15/628,833

(22) Filed: Jun. 21, 2017

(65) Prior Publication Data
US 2018/0373765 A1    Dec. 27, 2018

(51) Int. Cl.
*G06F 16/2458* (2019.01)
*G06F 16/33* (2019.01)
(Continued)

(52) U.S. Cl.
CPC ........ *G06F 16/2465* (2019.01); *G06F 16/278* (2019.01); *G06F 16/28* (2019.01); *G06F 16/33* (2019.01)

(58) Field of Classification Search
CPC ...... G06F 16/2465; G06F 16/27; G06F 16/28; G06F 16/33; G06F 16/24554; G06F 16/278

See application file for complete search history.

(56) References Cited

U.S. PATENT DOCUMENTS 6,609,131 B1 *   8/2003   Zait ................... G06F 9/5066
6,772,163 B1 *   8/2004   Sinclair ............. G06F 16/284
(Continued)

OTHER PUBLICATIONS

Granger et al. Solr in Action [online]. Manning Publications. Mar. 2014 [retrieved on Aug. 13, 2019]. Retrieved from the Internet: < URL: https://learning.oreilly.com/library/view/solr-in-action/9781617291029/> Chapters 1, 3, 5, 7, 12, 13. (Year: 2014).*

(Continued)

*Primary Examiner* — James E Richardson
(74) *Attorney, Agent, or Firm* — BainwoodHuang

(57) ABSTRACT

Techniques for implementing a non-relational database that makes efficient use of collections within the database. For one or more collections, two or more sub-collections can be created for storing documents. Each collection can be configured as a single partition entity or a partitioned entity within the database. Each sub-collection is identified by a sub-collection identifier. If the collection is configured as a partitioned entity, then a partition key can be determined for documents to be accessed in the collection. The partition key can be extended with the sub-collection ID to form a compound property (sub-collection ID, partition key) that determines placements of the respective documents in the identified sub-collection across partitions of the collection. If the collection is configured as a single partition entity, then a field for the partition key is ignored and the respective documents are placed in the identified sub-collection within the single partition of the collection.

15 Claims, 6 Drawing Sheets

(51) Int. Cl.
  *G06F 16/28* (2019.01)
  *G06F 16/27* (2019.01)

(56) References Cited

U.S. PATENT DOCUMENTS

| | | | | |
|---|---|---|---|---|
| 6,845,375 | B1* | 1/2005 | Sinclair | G06F 16/2282 |
| 8,631,028 | B1* | 1/2014 | Pettovello | G06F 16/8373 |
| | | | | 707/765 |
| 9,235,611 | B1* | 1/2016 | Murray | G06F 16/278 |
| 9,633,051 | B1* | 4/2017 | Maccanti | G06F 11/1451 |
| 10,025,943 | B1* | 7/2018 | Multani | G06F 16/11 |
| 2010/0235344 | A1* | 9/2010 | Chandrasekar | G06F 16/8365 |
| | | | | 707/713 |
| 2017/0091327 | A1* | 3/2017 | Bostic | G06F 16/258 |
| 2017/0103116 | A1* | 4/2017 | Hu | G06F 16/213 |
| 2017/0262638 | A1* | 9/2017 | Horowitz | G06F 21/602 |
| 2017/0308606 | A1* | 10/2017 | Jonsson | G06F 16/258 |
| 2017/0344588 | A1* | 11/2017 | Horowitz | G06F 16/2228 |
| 2018/0137144 | A1* | 5/2018 | Geissinger | G06F 16/25 |
| 2018/0314750 | A1* | 11/2018 | Merriman | G06F 16/278 |

OTHER PUBLICATIONS

Potter, Timothy. Introduction to SolrCloud. [online]. ApacheCon. Apr. 7, 2014 [retrieved on Aug. 13, 2019]. Retrieved form the Internet: <URL: https://events.static.linuxfound.org/sites/events/files/slides/ApacheCon_IntroSolrCloud.pdf>. (Year: 2014).*

Jeffrey. Massive Technical Interviews Tips: Solr Miscs. [online]. Aug. 13, 2015 [retrieved on Aug. 13, 2019]. Retrieved form the Internet: <URL: https://massivetechinterview.blogspot.com/2015/08/solr-miscs.html> (Year: 2015).*

Gr0. "Solr 4.1: SolrCloud—multiple shards on the same Solr node" [online]. Jan. 7, 2013. [retrieved on Nov. 26, 2019]. Retrieved from the Internet: <URL: https://solr.pl/en/2013/01/07/solr-4-1-solrcloud-multiple-shards-on-the-same-solr-node/> (Year: 2013).*

Rafał Kuć. "Solr Cookbook—Third Edition" [online]. Packt Publishing. Jan. 2015. [retrieved on Nov. 29, 2019]. Retrieved from the Internet: <URL: https://learning.oreilly.com/library/view/solr-cookbook-/9781783553150/>. Chapter 7 (Year: 2015).*

Gupta ('Multi level composite-id routing in SolrCloud'. Lucidworks [online]. Jan. 6, 2014 [retrieved May 15, 2020]. Retrieved from the Internet: <https://lucidworks.com/post/multi-level-composite-id-routing-solrcloud/>. (Year: 2014).*

Lucidworks (Solr Cloud Document Routing. Lucidworks [online]. Jun. 13, 2013 [retrieved May 15, 2020]. Retrieved from the Internet: <https://lucidworks.com/post/solr-cloud-document-routing/>. (Year: 2013).*

Whitlatch, Kim, et al., "Introduction to DocumentDB: A NoSQL JSON Database", Ascent Technology, GitHub, Nov. 22, 2016 <<https://www.ascent.tech/wp-content/uploads/documents/microsoft/documentdb/documentdb.pdf>> accessed on Aug. 2, 2018, 611 pages.

* cited by examiner

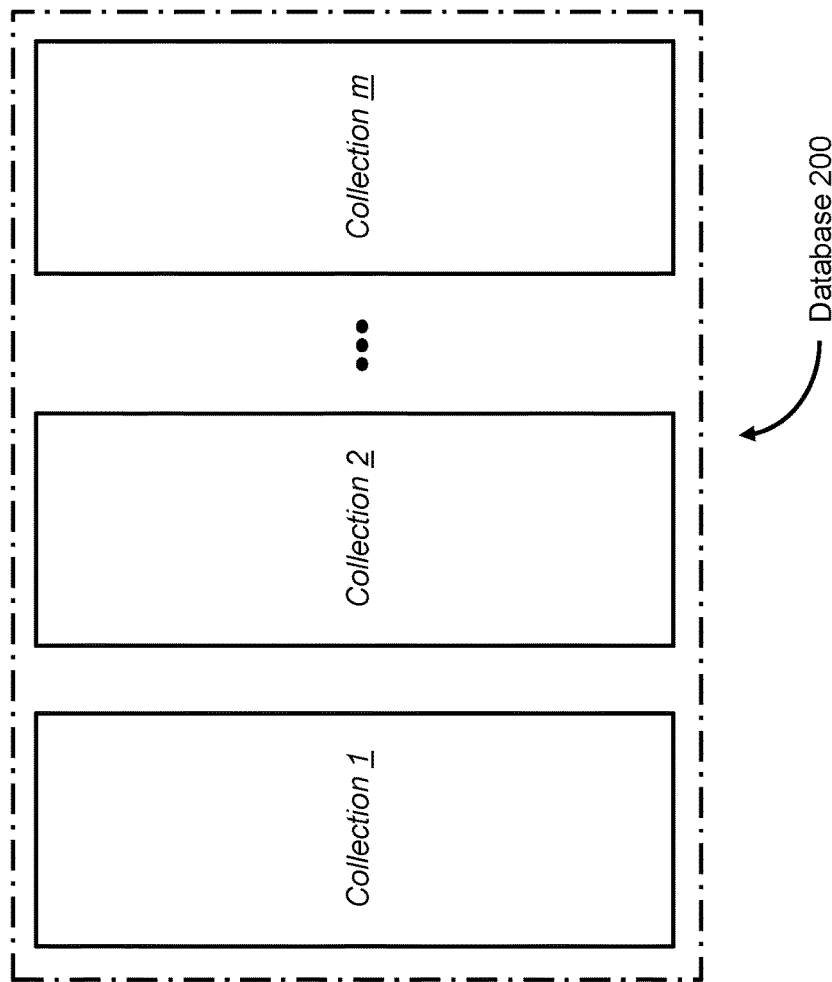
*Fig. 2 – Prior art*
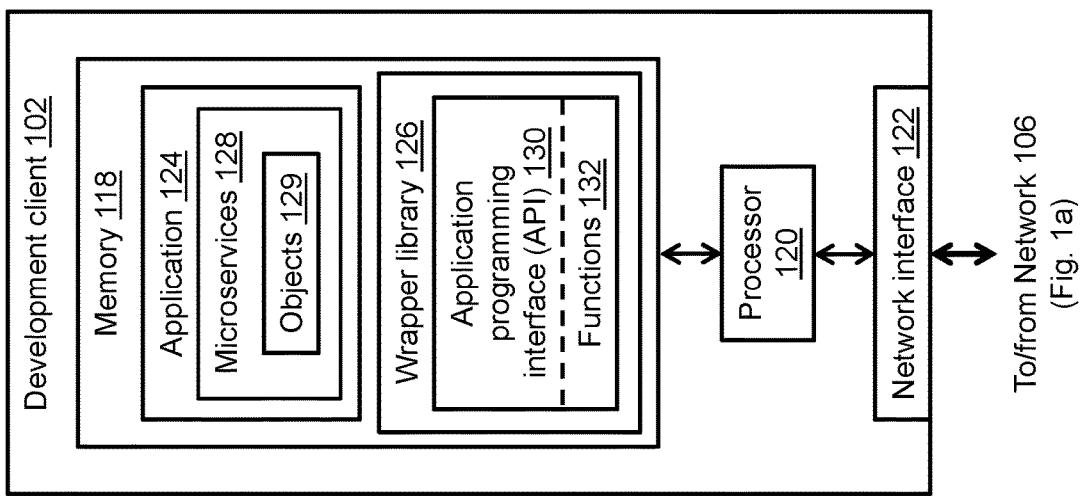
*Fig. 1b*

SYSTEMS AND METHODS OF SHARING A DATABASE ACROSS MULTIPLE DEPLOYMENTS AND SERVICES

BACKGROUND

Relational databases are mechanisms for storing and retrieving data based on a relational data model, which generally organizes data into one or more tables of rows and columns. Such relational databases generally employ a fixed schema or structure, which defines the tables and a relationship between the data contained in the tables. Non-relational databases are mechanisms for storing and retrieving data that are modeled other than in the tabular relational form. Such non-relational databases are schema-free (i.e., the data has no fixed schema or structure), and are generally capable of handling large volumes of data with high throughput and low latency relative to relational databases.

SUMMARY

Improved techniques are disclosed herein for implementing a non-relational database that makes more efficient use of collections within the database. For one or more collections, two or more sub-collections can be created for storing documents. Each collection can be configured as a single partition entity or a partitioned entity within the database. Each sub-collection is identified by a sub-collection identifier. If the collection is configured as a partitioned entity, then a partition key can be determined for documents to be stored or otherwise accessed in the collection. The partition key can be extended with the sub-collection ID to form a compound property (sub-collection ID, partition key) that determines placements of the respective documents in the identified sub-collection across multiple partitions of the collection. If the collection is configured as a single partition entity, then a field for the partition key is ignored and the respective documents are placed in the identified sub-collection within the single partition of the collection.

In certain embodiments, a method is provided of implementing a database that makes more efficient use of a limited number of collections within a database storage resource. The database is hosted by a database server. The method includes creating a collection in the database for storing one or more documents, and creating a plurality of sub-collections within the collection. The method further includes generating a sub-collection identifier (ID) for a respective document among the one or more documents. The sub-collection ID includes one or more predetermined identifiers (IDs) relating to a sub-collection among the plurality of sub-collections. The method still further includes generating a query for the respective document, in which the query includes the one or more predetermined IDs relating to the sub-collection, and providing the query for the respective document to the database server hosting the database.

In certain further embodiments, another method is provided of implementing a database that makes more efficient use of a limited number of collections within a database storage resource. The method includes creating a collection in the database for storing one or more documents, in which the collection has a plurality of partitions, and creating a plurality of sub-collections within the collection. The method further includes generating a sub-collection identifier (ID) for a respective document among the one or more documents, in which the sub-collection ID includes one or more predetermined identifiers (IDs) relating to a sub-collection among the plurality of sub-collections. The method still further includes determining a partition key for the respective document, and extending the partition key to include (1) the one or more predetermined IDs relating to the sub-collection, and (2) the partition key for the respective document. The method also includes generating a query for the respective document, in which the query includes the extended partition key, and providing the query for the respective document to the database server hosting the database.

In certain additional embodiments, a system is provided for implementing a database that makes more efficient use of a limited number of collections within a database storage resource. The system includes a database server having storage processing circuitry and a data storage resource, which contains the database. The storage processing circuitry is operative to create a collection in the database for storing one or more documents, and to create a plurality of sub-collections within the collection. The development client includes at least one processor operative to execute at least one computer program out of at least one memory to provide, to the database server, a query for a respective document among the one or more documents, in which the query includes a sub-collection identifier (ID) for the respective document. The storage processing circuitry is further operative to identify a sub-collection among the plurality of sub-collections using the sub-collection ID included in the query, and to access the respective document in the identified sub-collection of the collection.

In certain further embodiments, a computer program product is provided that has non-transitory computer readable media storing at least one set of instructions to implement a database that makes more efficient use of a limited number of collections within a database storage resource. The set of instructions, when carried out by computerized circuitry, cause the computerized circuitry to perform a method of creating a collection in the database for storing one or more documents, and creating a plurality of sub-collections within the collection. The method includes generating a sub-collection identifier (ID) for a respective document among the one or more documents, in which the sub-collection ID includes one or more predetermined identifiers (IDs) relating to a sub-collection among the plurality of sub-collections. The method further includes generating a query for the respective document, in which the query includes the one or more predetermined IDs relating to the sub-collection, and providing the query for the respective document to the database server hosting the database.

Other features, functions, and aspects of the disclosed systems and methods will be evident from the Detailed Description that follows.

BRIEF DESCRIPTION OF THE DRAWINGS

The foregoing and other objects, features, and advantages will be apparent from the following description of particular embodiments of the disclosed systems and methods, as illustrated in the accompanying drawings, in which like reference characters refer to the same parts throughout the different views.

FIG. 1b is a block diagram of an exemplary development client computer that can be employed in the environment of FIG. 1a;

FIG. 2 is a block diagram of a conventional non-relational database that includes multiple collections for storing users' documents or other data;

DETAILED DESCRIPTION

Improved techniques are disclosed herein for implementing a non-relational database that makes more efficient use of collections within the database. For one or more collections, two or more sub-collections can be created for storing users' documents. Each collection can be configured as a single partition entity or a partitioned entity within the database. Each sub-collection is identified by a sub-collection identifier (ID). If the collection is configured as a partitioned entity, then a partition key can be determined for documents to be stored or otherwise accessed in the collection. The partition key can be extended with the sub-collection ID to form a compound property (sub-collection ID, partition key) that determines placements of the respective documents in the identified sub-collection across multiple partitions of the collection. If the collection is configured as a single partition entity, then a field for the partition key is ignored and the respective documents are placed in the identified sub-collection within the single partition of the collection.

Figure 1A:
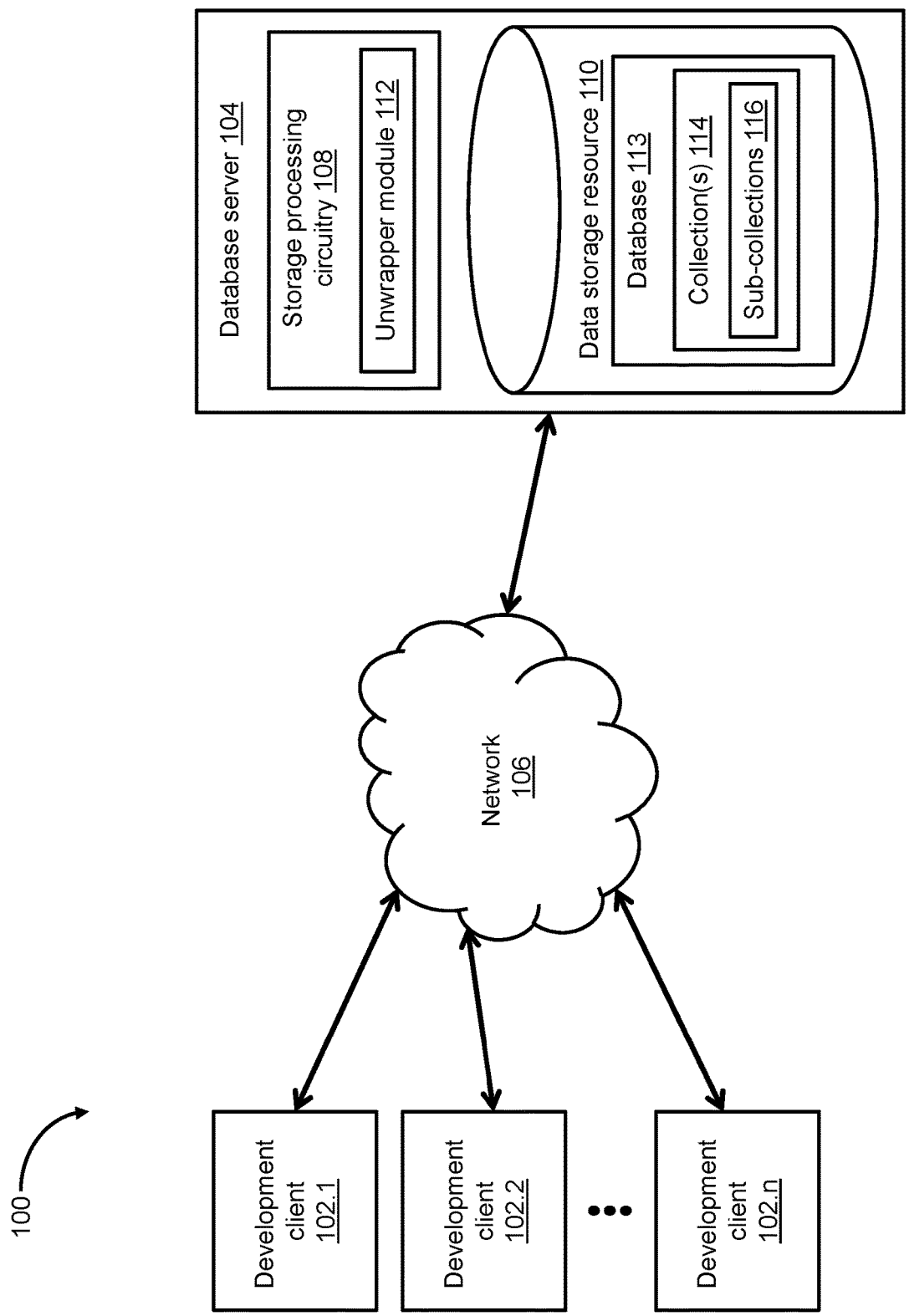
FIG. 1a is a block diagram of a computer program application development environment, in which improved techniques for implementing a non-relational database that makes more efficient use of a limited number of collections within the database can be employed.

FIG. 1a depicts an application development environment (also referred to herein as the "development environment") 100, in which improved techniques for implementing a non-relational database that makes more efficient use of a limited number of collections within the database can be employed. As shown in FIG. 1a, the development environment 100 can include a plurality of application development client computers (also referred to herein as the "development client(s)") 102.1, 102.2, . . . , 102.n communicably coupled to a database server computer (also referred to herein as the "database server") 104 by at least one network 106. The database server 104 can include storage processing circuitry 108, and a data storage resource 110 such as a magnetic disk, a compact disk, an optical disk, a flash drive, a solid state drive (SSD), or any other suitable data storage resource. The database server 104 can host, in the data storage resource 110, at least one database 113, which can be a non-relational database such as DocumentDB (also known as Azure™ Cosmos DB sold by Microsoft Corporation, Redmond, Wash., USA), MongoDB, or any other suitable database.

FIG. 1b depicts an illustrative embodiment of an exemplary development client 102, which can be employed within the development environment 100 of FIG. 1a. It is noted that the development clients 102.1, 102.2, . . . , 102.n of FIG. 1a can each be configured like the development client 102 of FIG. 1b. As shown in FIG. 1b, the development client 102 can include at least one processor 120 operative to execute at least one computer program out of at least one memory 118 for implementing the improved techniques disclosed herein, as well as a network interface 122 for interfacing with the network 106. The memory 118 can accommodate at least one computer program application 124 (also referred to herein as the "application") under development, as well as a wrapper library 126 that can be downloaded to the development client 102 over the network 106.

As further shown in FIG. 1b, the application 124 can have a plurality of microservices 128 associated therewith. Each microservice 128 can correspond to an independent unit of the application 124 that can be created and (possibly) destroyed during the development of the application 124. The microservices 128 can be associated with various types of database objects 129, which can have their own schema or structure. The various types of database objects 129 (e.g., documents or other data) of the respective microservices 128 can be efficiently stored in the database 113 in a way that prevents the documents from being visible to any of the other microservices 128 sharing the database 113. The database 113 can be configured to include a number of collections 114 (see FIG. 1a), each of which can have multiple sub-collections 116 for storing the documents of the respective microservices 128. A plurality of database operations (including create, read, update, and delete (CRUD) operations) for accessing one or more documents in the sub-collections 116 are facilitated by the wrapper library 126. The wrapper library 126 can include a list of predetermined functions 132 (e.g., CRUD functions) associated with an application programming interface (API) 130, a definition of which can be provided to an application developer during development of the application 124. Such predetermined functions of the wrapper library 126 can effectively wrap or encapsulate queries to the database 113, which can be unwrapped or de-encapsulated by an unwrapper module 112 (see FIG. 1a) within the storage processing circuitry 108 of the database server 104.

As described herein, the database 113 hosted by the database server 104 (see FIG. 1a) can be configured to include a number of collections 114 for storing documents of the microservices 128 of the application 124 (see FIG. 1b) under development. FIG. 2 depicts a representation of a number of conventional collections 1, 2, . . . , m that can be included in a database 200 hosted by a suitable database server. In a known non-relational database, such as DocumentDB, one or more partitioned (or single partition) collections, like the collections 1, 2, . . . , m, can be created for storing one or more database objects, such as documents or other data. A "partition" is defined herein as a physical storage node of a data storage resource that can host or store such documents or other data. Each partition of a partitioned collection can host one or more values of a partition key, which corresponds to a chosen property within one or more documents that determines placements of the documents across multiple partitions of the collection. When a document is added to the partitioned collection, the partition key is retrieved from the document, a value of the partition key is determined (e.g., using any suitable hash function or digital signature), and the document is grouped together into a logical shard (also known as a "horizontal partition") with any other document(s) having the same value of the partition key and placed in the partition hosting that value of the partition key. If a collection is configured as a single partition collection, then all documents are placed in the single partition of the collection.

There are drawbacks to known non-relational databases, in which collections like the conventional collections 1, 2, . . . , m of FIG. 2 can be created. For example, the maximum total number of such collections that can be created within the database 200 is typically limited. This can be problematic for application developers who may have the task of developing applications that require multiple deployments, each of which can include a number of microservices that can exceed the maximum total number of collections within the database. In a distributed computing environment, such deployments of applications can have hundreds, if not thousands of microservices, each of which can require a share of the database, but may not want its data to be visible to any of the other microservices sharing the same database. Further, each microservice can be associated with a certain type of database object, which can have its own schema or structure for data. Such a scenario may dictate that each microservice of an application under development have its own collection within a database. However, because the maximum total number of collections within the database is limited, multiple databases may be required to support the many microservices of the application. Moreover, because application developers are typically charged for such databases on a per collection basis, the costs involved for developing applications with many microservices can quickly become prohibitive.

Figure 3A:
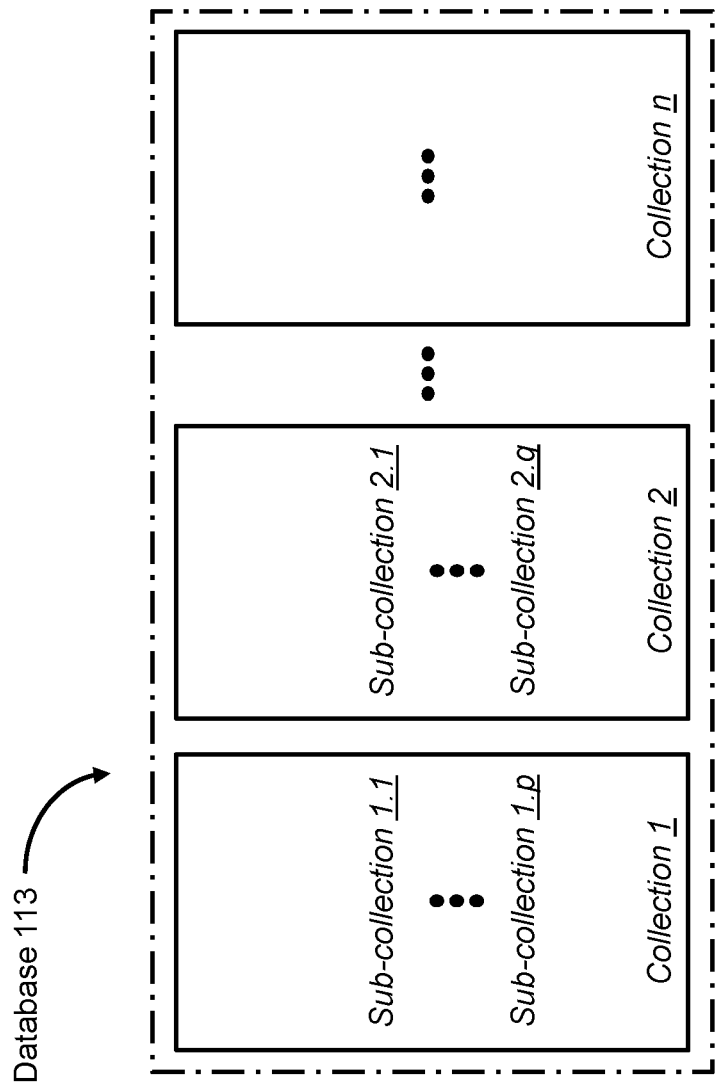
FIG. 3a is a block diagram of an exemplary non-relational database that can be implemented within the environment of FIG. 1a, in which the database includes multiple collections, and one or more of the multiple collections can include a plurality of sub-collections for storing users' documents or data.

At least some of the drawbacks of such known non-relational databases can be avoided by creating a plurality of sub-collections within one or more collections of a database. FIG. 3a depicts an exemplary representation of an illustrative embodiment of a number of collections 1, 2, . . . , n, which can be included in the database 113 hosted by the database server 104 (see FIG. 1a). The collections 1, 2, . . . , n can be remotely (or locally) created on the database server 104 by an application developer using the development client 102 (see FIG. 1b). Each of the collections 1, 2, . . . , n can have zero, one, two, or more than two sub-collections for storing documents of the respective microservices 128. For example, Collection 1 (see FIG. 3a) can have two or more sub-collections 1.1, . . . , 1.p, and Collection 2 (see also FIG. 3a) can have two or more sub-collections 2.1, . . . , 2.q.

Such creation and use of multiple sub-collections within collections of a database, such as Collection 1 and Collection 2 of FIG. 3a, will be further understood with reference to the following illustrative example. In this example, each of the collections 1, 2, . . . , n corresponds to one of the collections 114 (see FIG. 1a) created for the database 113 within the data storage resource 110 of the database server 104. For example, using the development client 102, the application developer can create Collection 1 as a single partition entity within the database 113, and create Collection 2 as a partitioned entity within the database 113. Further, the sub-collections 1.1, . . . , 1.p of Collection 1, as well as the sub-collections 2.1, . . . , 2.q of Collection 2, correspond to at least some of the sub-collections 116 (see FIG. 1a) within the collection 114.

Having created Collection 1 (see FIG. 3a) within the database 113 as a single partition entity, the application developer can create, update, store, or otherwise access, within the single partition of Collection 1, one or more database objects 129 (see FIG. 1b) (e.g., documents or other data) of one or more microservices 128 of the application 124 under development. In this example, each of the documents to be created, updated, stored, or otherwise accessed in Collection 1 is associated with a specified deployment of the application 124, a specified microservice among the microservices 128, and a specified type of database object. For example, the specified deployment may be a "staging" deployment, the specified microservice may be a "customer information unit" of the application 124, and the specified database object type may be "customer." Further, each document can have a format that includes a first field for an object ID (objectId), as well as one or more second fields for certain auxiliary data (e.g., a customer's first name (firstName), last name (lastName), age, etc.), as follows:

```
{
    objectId: "document_1",
    firstName: "William",
    lastName: "Smith",
    age: "27"
}.
```

It is noted that the application developer can download the wrapper library 126 to the development client 102 for use in providing CRUD queries to the database 113 for documents of the specified microservice. For example, the wrapper library 126 can be associated with the API 130, and a definition of the wrapper API 130 can be provided to the application developer via the development client 102.

Figure 3B:
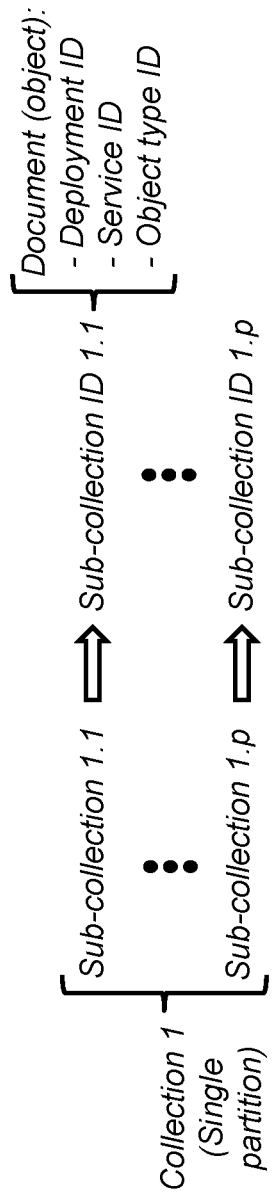
FIG. 3b illustrates that a single-partition collection within the database of FIG. 3a can include a plurality of sub-collections, the plurality of sub-collections can have a plurality of sub-collection identifiers (IDs), respectively, and each sub-collection ID can include one or more specified IDs.

Using the development client 102, the application developer can generate a "create" or "update" query for a document of the specified microservice (i.e., customer information unit) within the database 113. Such a create/update query can be generated as an API call to the create/update function of the wrapper library 126, which effectively wraps or encapsulates the create/update query to enable the database server 104 to create, update, store, or otherwise access the document in the single partition of Collection 1 (see FIG. 3a). In response to the API call to the create/update function of the wrapper library 126, an identifier (ID) for a sub-collection (e.g., Sub-collection 1.1; see FIG. 3a) is generated for the respective document. In this example, the ID for Sub-collection 1.1 (i.e., Sub-collection ID 1.1; see FIG. 3b) can include a plurality of identifiers (IDs) generated for the specified deployment (i.e., staging), the specified microservice (i.e., customer information unit), and the specified database object type (i.e., customer). For purposes of illustration, FIG. 3b shows that the single partition collection, i.e., Collection 1, can include the two or more sub-collections 1.1, . . . , 1.p, and that the two or more sub-collection IDs 1.1, . . . , 1.p, respectively. FIG. 3b further shows, with reference to Sub-collection ID 1.1, that each respective sub-collection ID 1.1, ..., 1.p can include a specified deployment ID (Deployment ID), a specified microservice ID (Service ID), and a specified database object type ID (Object type ID), each of which is associated with the document of the specified microservice (i.e., customer information unit).

In further response to the API call to the create/update function of the wrapper library 126, the format of the document is modified to include a first field for the Deployment ID (deploymentId), a second field for the Service ID (serviceId), a third field for the Object type ID (objectTypeId), a fourth field for the object ID (objectId), as well as one or more fifth fields for the auxiliary data (i.e., the customer's first name (firstName), last name (lastName), age, etc.), as follows:

```
{
    deploymentId: "staging_123",
    serviceId: "customer_information_unit_123",
    objectTypeId: "customer_123",
    objectId: "document_1",
    firstName: "William",
    lastName: "Smith",
    age: "27"
}.
```

Upon receipt of the wrapped or encapsulated create/update query at the database server 104, the unwrapper module 112 unwraps or de-encapsulates the create/update query to obtain the plurality of identifiers included in Sub-collection ID 1.1, namely, the Deployment ID (deploymentId), the Service ID (serviceId), and the Object type ID (objectTypeId). The document is then placed, stored, or otherwise accessed in Sub-collection 1.1 within the single partition of Collection 1.

Accordingly, with reference to Collection 1 (see FIG. 3a) of the database 113, documents having the same sub-collection ID (e.g., the same Deployment ID, the same Service ID, and the same Object type ID) can be placed, stored, or otherwise accessed in the same sub-collection 1.1, ..., or 1.p of Collection 1. Further, documents having different sub-collection IDs (e.g., one or more different Deployment IDs, Service IDs, or Object type IDs) can be placed, stored, or otherwise accessed, as well as isolated from one another, in different sub-collections 1.1, ..., 1.p of Collection 1.

With further reference to Collection 1 (see FIG. 3a) of the database 113, the application developer can also generate a read query for a document of the specified microservice stored within the database 113. Such a read query can be generated at the development client 102 as an API call to a read function of the wrapper library 126. Such a read query can be expressed, as follows:

"Select*from customers where age>25."

The read function of the wrapper library 126 effectively wraps or encapsulates the read query to enable the database server 104 to read one or more documents from a sub-collection (e.g., Sub-collection 1.1; see FIG. 3a) of Collection 1. In response to the API call to the read function of the wrapper library 126, one or more fields indicating the identifier for Sub-collection 1.1 (i.e., Sub-collection ID 1.1; see FIG. 3b), namely, a first field for the Deployment ID (deploymentId), a second field for the Service ID (serviceId), and a third field for the Object type ID (objectTypeId), are incorporated into the read query, as follows:

"Select*from customers where age>25 and
deploymentId: "staging_123",
serviceId: "customer_information_unit_123",
objectTypeId: "customer_123"."

Upon receipt of the wrapped or encapsulated read query at the database server 104, the unwrapper module 112 unwraps or de-encapsulates the read query to obtain the plurality of identifiers included in Sub-collection ID 1.1, namely, the Deployment ID (deploymentId), the Service ID (serviceId), and the Object type ID (objectTypeId). One or more documents where the customer age in the auxiliary data is indicated as being greater than 25 are then read from Sub-collection 1.1 within the single partition of Collection 1.

With further regard to this illustrative example, having created Collection 2 (see FIG. 3a) of the database 113 as a partitioned entity, the application developer can create, update, store, or otherwise access within multiple partitions of Collection 2, one or more database objects 129 (e.g., documents or data) of one or more microservices 128 of the application 124 under development. As described herein with reference to Collection 1, each of the documents to be created, updated, stored, or otherwise accessed in Collection 2 can be associated with a specified deployment of the application 124, a specified microservice among the microservices 128, and a specified type of database object. For example, the specified deployment may be a "production" deployment, the specified microservice may be a "customer billing unit" of the application 124, and the specified database object type may be "billing." Further, the application developer can determine a partition key for the documents to be stored in Collection 2. For example, the partition key can correspond to a chosen property within the documents of the specified microservice, such as "city" or any other suitable chosen property. In addition, each document can have a format that includes a first field for the partition key of the object (partitionKey_of_object), a second field for an object ID (objectId), as well as one or more third fields for certain auxiliary data (e.g., a customer's first name (firstName), last name (lastName), billing period (billingPeriod), etc.), as follows:

```
{
    partitionKey_of_object: "Boston",
    objectId: "document_2",
    firstName: "Charlie",
    lastName: "Harrington",
    billingPeriod: "31-60 days"
}.
```

Figure 3C:
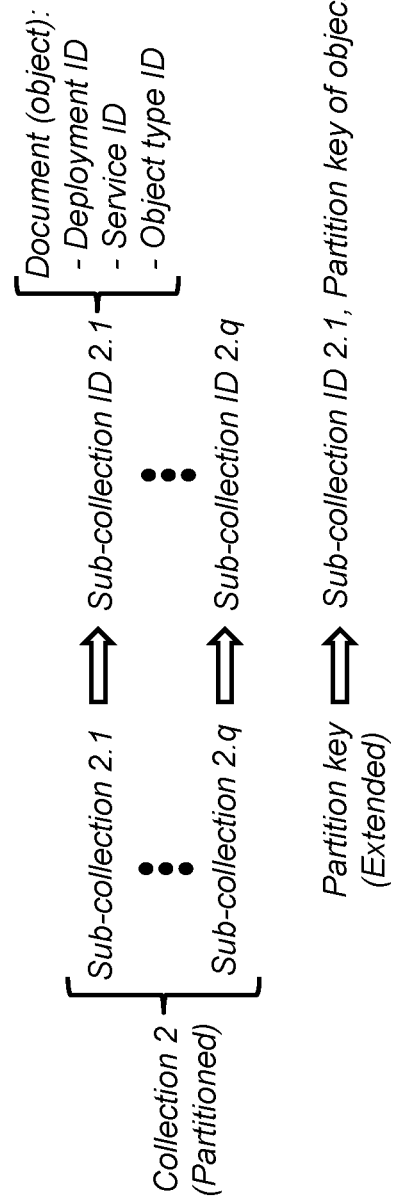
FIG. 3c illustrates that a partitioned collection within the database of FIG. 3a can include a plurality of sub-collections, the plurality of sub-collections can have a plurality of sub-collection IDs, respectively, each sub-collection ID can include one or more specified IDs, and a partition key for the partitioned collection can be extended to include both a respective sub-collection ID and a partition key that corresponds to a chosen property within the users' documents or other data.

Using the development client 102, the application developer can generate a "create" or "update" query for a document of the specified microservice within the database 113. Such a create/update query can be generated as an API call to the create/update function of the wrapper library 126, which effectively wraps or encapsulates the create/update query to enable the database server 104 to create, update, store, or otherwise access the document in a partition of Collection 2 (see FIG. 3a). In response to the API call to the create/update function of the wrapper library 126, an extended partition key (Partition key) is generated as a string that includes an identifier (ID) for a sub-collection (e.g., Sub-collection 2.1; see FIG. 3a) and the partition key of the object (partitionKey of object). Further, the ID for Sub-collection 2.1 (i.e., Sub-collection ID 2.1; see FIG. 3c) is generated for the respective document that includes a specified deployment ID (Deployment ID), a specified microservice ID (Service ID), and a specified database object type ID (Object type ID). In this example, Sub-collection ID 2.1 can include a plurality of identifiers (IDs) generated for the specified deployment (i.e., production), the specified microservice (i.e., customer billing unit), and the specified database object type (i.e., billing). For purposes of illustration, FIG. 3c shows that the partitioned collection, i.e., Collection 2, can include the two or more sub-collections 2.1, . . . , 2.q, and that the two or more sub-collections 2.1, . . . , 2.q can have two or more sub-collection IDs 2.1, . . . , 2.q, respectively. FIG. 3c further shows, with reference to Sub-collection ID 2.1, that each respective sub-collection ID 2.1, . . . , 2.q can include a specified deployment ID (Deployment ID), a specified microservice ID (Service ID), and a specified database object type ID (Object type ID), each of which is associated with the document of the specified microservice (i.e., customer billing unit). In addition, FIG. 3c shows that the extended partition key can be generated as the string that includes Sub-collection ID 2.1 and the partition key of the object.

In further response to the API call to the create/update function of the wrapper library 126, the format of the document is modified to include a first field for the extended partition key (partitionKey), a second field for the Deployment ID (deploymentId), a third field for the Service ID (serviceId), a fourth field for the Object type ID (objectTypeId), a fifth field for the partition key of the object (partitionKey of object), a sixth field for the object ID (objectId), as well as one or more seventh fields for the auxiliary data (e.g., the customer's first name (firstName), last name (lastName), billing period (billingPeriod), etc.), as follows:

```
{
    partitionKey:
    [deploymentId]:[serviceId]:[objectTypeId]:[partitionKey_of_object]
    deploymentId: "production_123",
    serviceId: "customer_billing_unit_123",
    objectTypeId: "billing_123",
    partitionKey_of_object: "Boston",
    objectId: "document_2",
    firstName: "Charlie",
    lastName: "Harrington",
    billingPeriod: "31-60 days"
},
``` in which "partitionKey" is a string that includes the Deployment ID (i.e., production_123), the Service ID (i.e., customer_billing_unit_123), the Object type ID (i.e., billing_123), and the partition key of the object (i.e., Boston).

Upon receipt of the wrapped or encapsulated create/update query at the database server 104, the unwrapper module 112 unwraps or de-encapsulates the create/update query to obtain the plurality of identifiers included in Sub-collection ID 2.1, namely, the Deployment ID (deploymentId), the Service ID (serviceId), and the Object type ID (objectTypeId), as well as the extended partition key (i.e., the string that includes the Deployment ID, the Service ID, the Object type ID, and the partition key of the object). Further, a value of the extended partition key is determined (e.g., using any suitable hash function or digital signature), and the document is placed, stored, or otherwise accessed in Sub-collection 2.1 within the partition of Collection 2 that hosts the value of the extended partition key.

Accordingly, with reference to Collection 2 (see FIG. 3a) of the database 113, documents having the same sub-collection ID (e.g., the same Deployment ID, the same Service ID, and the same Object type ID) can be placed, stored, or otherwise accessed in the same sub-collection 2.1, . . . , or 2.q of Collection 2. Further, documents having both the same sub-collection ID and the same extended partition key can be placed, stored, or otherwise accessed in the same sub-collection 2.1, . . . , or 2.q of Collection 2, as well as the same partition of Collection 2 that hosts the value of the extended partition key. In addition, documents having different sub-collection IDs and/or different extended partition keys (e.g., one or more different Deployment IDs, Service IDs, Object type IDs, or partition keys of the object) can be placed, stored, or otherwise accessed, as well as isolated from one another, in different sub-collections 2.1, . . . , 2.q of Collection 2 and/or different partitions of Collection 2.

With further reference to Collection 2 (see FIG. 3a) of the database 113, the application developer can also generate a read query for a document of the specified microservice stored within the database 113. Such a read query can be generated at the development client 102 as an API call to a read function of the wrapper library 126. Such a read query can be expressed, as follows:

"Select*from billings where billing period>30 days."

The read function of the wrapper library 126 effectively wraps or encapsulates the read query to enable the database server 104 to read one or more documents from a sub-collection (e.g., Sub-collection 2.1; see FIG. 3a) of Collection 2. In response to the API call to the read function of the wrapper library 126, one or more fields indicating an identifier for Sub-collection 2.1 (i.e., Sub-collection ID 2.1; see FIG. 3c), namely, a first field for the Deployment ID (deploymentId), a second field for the Service ID (serviceId), and a third field for the Object type ID (objectTypeId), are incorporated into the read query, as follows:

"Select*from billings where billing period>30 days" and
deploymentId: "production_123",
serviceId: "customer_billing_unit_123",
objectTypeId: "billing_123".

Upon receipt of the wrapped or encapsulated read query at the database server 104, the unwrapper module 112 unwraps or de-encapsulates the read query to obtain the plurality of identifiers included in Sub-collection ID 2.1, namely, the Deployment ID (deploymentId), the Service ID (serviceId), and the Object type ID (objectTypeId). One or more documents where the billing period is greater than 30 days are then read from Sub-collection 2.1 across the multiple partitions of Collection 2.

Figure 4A:
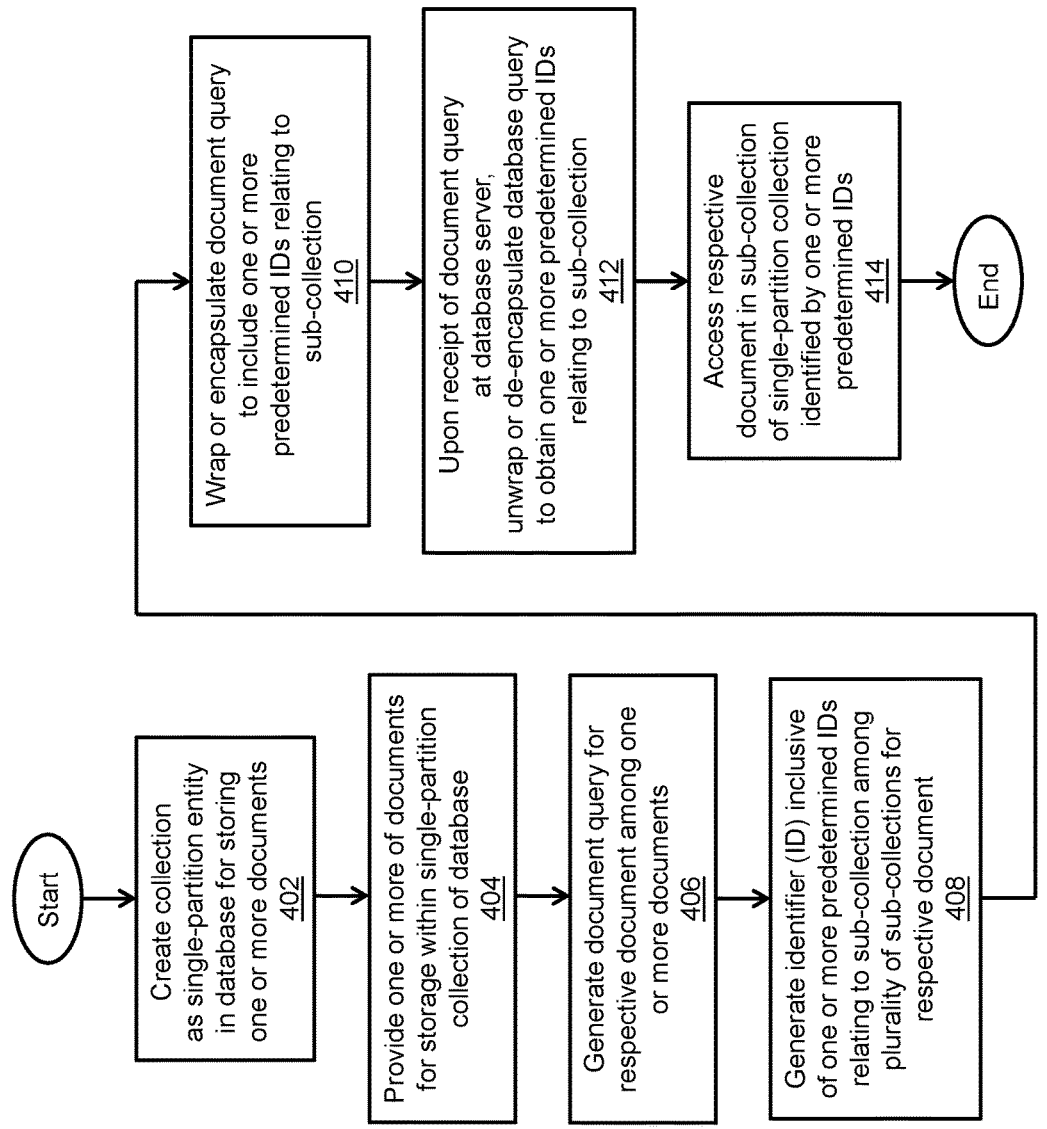
FIG. 4a is a flow diagram of an exemplary method of implementing a non-relational database that makes more efficient use of a limited number of collections within a database storage resource, using at least one collection configured as a single-partition entity and including a plurality of sub-collections.

A method of implementing a non-relational database that makes more efficient use of a limited number of collections within a database storage resource, using at least one collection configured as a single-partition entity and including a plurality of sub-collections, is described below with reference to FIG. 4a. As depicted in block 402, a collection is created as a single-partition entity in the database for storing one or more documents. As depicted in block 404, one or more of the documents are provided for storage within the single-partition collection of the database. As depicted in block 406, a document query is generated for a respective document among the one or more documents. As depicted in block 408, an identifier (ID) inclusive of one or more predetermined IDs relating to a sub-collection among the plurality of sub-collections is generated for the respective document. As depicted in block 410, the document query is wrapped or encapsulated to include the one or more predetermined IDs relating to the sub-collection. As depicted in block 412, upon receipt of the document query at a database server, the database query is unwrapped or de-encapsulated to obtain the one or more predetermined IDs relating to the sub-collection. As depicted in block 414, the respective document is accessed in the sub-collection of the single-partition collection identified by the one or more predetermined IDs.

Figure 4B:
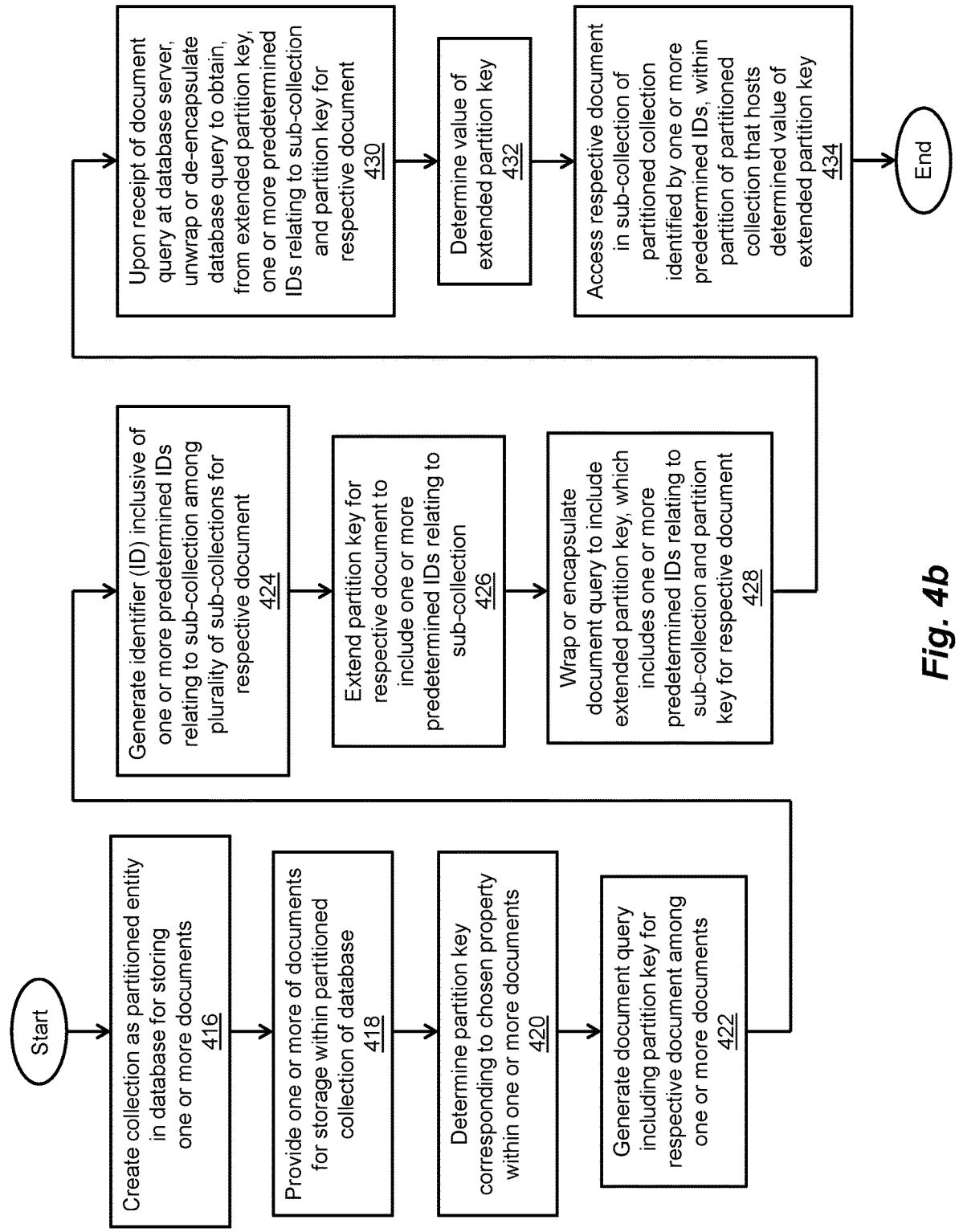
FIG. 4b is a flow diagram of an exemplary method of implementing a non-relational database that makes more efficient use of a limited number of collections within a database storage resource, using at least one collection configured as a partitioned entity and including a plurality of sub-collections.

Another method of implementing a non-relational database that makes more efficient use of a limited number of collections within a database storage resource, using at least one collection configured as a partitioned entity and including a plurality of sub-collections, is described below with reference to FIG. 4b. As depicted in block 416, a collection is created as a partitioned entity in the database for storing one or more documents. As depicted in block 418, one or more of the documents are provided for storage within the partitioned collection of the database. As depicted in block 420, a partition key is determined corresponding to a chosen property within the one or more documents. As depicted in block 422, a document query including the partition key is generated for a respective document among the one or more documents. As depicted in block 424, an identifier (ID) inclusive of one or more predetermined IDs relating to a sub-collection among the plurality of sub-collections is generated for the respective document. As depicted in block 426, the partition key for the respective document is extended to include the one or more predetermined IDs relating to the sub-collection. As depicted in block 428, the document query is wrapped or encapsulated to include the extended partition key, which, in turn, includes the one or more predetermined IDs relating to the sub-collection and the partition key for the respective document. As depicted in block 430, upon receipt of the document query at a database server, the database query is unwrapped or de-encapsulated to obtain, from the extended partition key, the one or more predetermined IDs relating to the sub-collection and the partition key for the respective document. As depicted in block 432, a value of the extended partition key is determined, using, for example, any suitable hash function or digital signature. As depicted in block 434, the respective document is accessed in the sub-collection of the partitioned collection identified by the one or more predetermined IDs, within a partition of the partitioned collection that hosts the determined value of the extended partition key.

Although features are shown and described herein with reference to particular illustrative embodiments hereof, such features may be included and hereby are included in any of the disclosed embodiments and their variants. Thus, it is understood that features disclosed in connection with any embodiment are included as variants of any other embodiment. Further, the improvement or portions thereof may be embodied as a computer program product including one or more non-transient, computer-readable storage media, such as a magnetic disk, magnetic tape, compact disk, DVD, optical disk, flash drive, solid state drive (SSD), Secure Digital (SD) chip or device, Application Specific Integrated Circuit (ASIC), Field Programmable Gate Array (FPGA), and/or the like. Any number of computer-readable media may be used. The media may be encoded with instructions which, when executed on one or more computers or other processors, perform the process or processes described herein. Such media may be considered articles of manufacture or machines, and may be transportable from one machine to another.

As used throughout this document, the words "comprising," "including," "containing," and "having" are intended to set forth certain items, steps, acts, elements, or aspects of something in an open-ended fashion. Also, as used herein and unless a specific statement is made to the contrary, the word "set" or "subset" means one or more of something. This is the case regardless of whether the phrase "set of" or "subset of" is followed by a singular or plural object, and regardless of whether it is conjugated with a singular or plural verb. Further, although ordinal expressions, such as "first," "second," "third," and so on, may be used as adjectives herein, such ordinal expressions are used for identification purposes and, unless specifically indicated, are not intended to imply any ordering or sequence. Thus, for example, a "second" event may take place before or after a "first event," or even if no first event ever occurs. In addition, an identification herein of a particular element, feature, or act as being a "first" such element, feature, or act should not be construed as requiring that there must also be a "second" or other such element, feature, or act. Rather, the "first" item may be the only one. Although certain embodiments are disclosed herein, it is understood that these are provided by way of example only, and that the disclosed systems and methods are not limited to these particular embodiments.

While various embodiments of the disclosed systems and methods have been particularly shown and described, it will be understood by those skilled in the art that various changes in form and details may be made therein without departing from the scope of the disclosed systems and methods, as defined by the appended claims.

What is claimed is:

1. A method of implementing a non-relational database that makes more efficient use of a limited number of collections within a database storage resource, the non-relational database being hosted by a database server, the method comprising:

creating a collection of one or more documents in the non-relational database, the collection being created on a single partition of the database server;

creating a plurality of sub-collections within the collection so as to increase storage capacity of the non-relational database without an increase in a limited number of collections of the database storage resource, the plurality of sub-collections being created on the single partition of the database server;

generating a sub-collection identifier (ID) for a sub-collection from among the plurality of sub-collections, the sub-collection including a respective document from among the one or more documents of the collection, the sub-collection ID including a plurality of predetermined identifiers (IDs) that identify the sub-collection from among the plurality of sub-collections;

modifying a format of the respective document to include a plurality of document fields containing the plurality of predetermined IDs, respectively;

receiving a query to access the respective document of the collection, the query including a plurality of query fields containing the plurality of predetermined IDs, respectively, that identify the sub-collection within the collection;

identifying the sub-collection within the collection using the plurality of predetermined IDs contained in the plurality of query fields, respectively; and accessing, from the non-relational database, the respective document of the identified sub-collection on the single partition of the database server.

2. The method of claim 1 further comprising:

inserting the plurality of predetermined IDs into the plurality of document fields, respectively, of the format of the respective document.

3. The method of claim 2 further comprising:

obtaining the plurality of predetermined IDs from the plurality of document fields, respectively, of the format of the respective document, thereby obtaining the sub-collection ID for the sub-collection.

4. The method of claim 1 wherein the respective document has an associated document schema, wherein a respective second document among the one or more documents has an associated second document schema, wherein the second document schema is different from the document schema of the respective document, and wherein the method further comprises:
  generating a second sub-collection ID for a second sub-collection from among the plurality of sub-collections, the second sub-collection including the respective second document, the second sub-collection ID including a plurality of predetermined second IDs that identify the second sub-collection from among the plurality of sub-collections;
  modifying a format of the respective second document to include a plurality of second document fields containing the plurality of predetermined second IDs relating to the second sub-collection, respectively;
  receiving a second query to access the respective second document of the collection, the second query including a plurality of second query fields containing the plurality of predetermined second IDs, respectively, that identify the second sub-collection within the collection; and
  accessing, from the non-relational database, the respective second document of the second sub-collection on the single partition of the database server based on the plurality of predetermined second IDs contained in the plurality of second query fields, respectively.

5. The method of claim 1 wherein the plurality of predetermined IDs that identify the sub-collection include a first predetermined ID corresponding to a specified deployment of a software application, a second predetermined ID corresponding to a specified microservice of the software application, and a third predetermined ID corresponding to a specified type of database object associated with the specified microservice.

6. A method of implementing a non-relational database that makes more efficient use of a limited number of collections within a database storage resource, the non-relational database being hosted by a database server, the method comprising:
  creating a collection of one or more documents in the non-relational database, the collection being created across a plurality of partitions of the database server;
  creating a plurality of sub-collections within the collection so as to increase storage capacity of the non-relational database without an increase in a limited number of collections of the database storage resource, a portion of the plurality of sub-collections being created on a single partition from among the plurality of partitions of the database server;
  generating a sub-collection identifier (ID) for a sub-collection from among the portion of the plurality of sub-collections, the sub-collection including a respective document from among the one or more documents of the collection, the sub-collection ID including a plurality of predetermined identifiers (IDs) that identify the sub-collection from among the plurality of sub-collections;
  determining a partition key for the respective document, a value of the partition key being hosted by a respective one of the plurality of partitions of the database server;
  extending the partition key to include the plurality of predetermined IDs relating to the sub-collection and the partition key for the respective document;
  modifying a format of the respective document to include a plurality of document fields containing the plurality of predetermined IDs, respectively, and an additional document field containing the partition key;
  receiving a query to access the respective document of the collection, the query including a plurality of query fields containing the plurality of predetermined IDs, respectively, that identify the sub-collection within the collection, and an additional query field containing the partition key;
  identifying the sub-collection within the collection using the plurality of predetermined IDs contained in the plurality of query fields, respectively, and the partition key contained in the additional query field; and
  accessing, from the non-relational database, the respective document of the identified sub-collection on the respective one of the plurality of partitions of the database server.

7. The method of claim 6 further comprising:
inserting the partition key into the additional document field.

8. The method of claim 7 further comprising:
inserting the plurality of predetermined IDs into the plurality of document fields, respectively, of the format of the respective document.

9. The method of claim 8 further comprising:
obtaining the partition key for the respective document from the additional document field.

10. The method of claim 9 further comprising:
obtaining the value of the partition key.

11. The method of claim 10 further comprising:
obtaining the plurality of predetermined IDs from the plurality of document fields, respectively, thereby obtaining the sub-collection ID for the sub-collection.

12. The method of claim 10 further comprising:
accessing the respective document in the identified sub-collection of the collection within the respective one of the plurality of partitions hosting the value of the partition key.

13. A system for implementing a non-relational database that makes more efficient use of a limited number of collections within a database storage resource, comprising:
  a database server including storage processing circuitry and a data storage resource, the data storage resource containing the non-relational database,
  wherein the storage processing circuitry is operative:
    to create a collection of one or more documents in the non-relational database, the collection being created on a single partition of the database server;
    to create a plurality of sub-collections within the collection so as to increase storage capacity of the non-relational database without an increase in a limited number of collections of the database storage resource, the plurality of sub-collections being created on the single partition of the database server;
    to generate a sub-collection identifier (ID) for a sub-collection from among the plurality of sub-collections, the sub-collection including a respective document from among the one or more documents of the collection, the sub-collection ID including a plurality of predetermined identifiers (IDs) that identify the sub-collection from among the plurality of sub-collections; and
    to modify a format of the respective document to include a plurality of document fields containing the plurality of predetermined IDs, respectively;

to receive a query to access the respective document of the collection, the query including a plurality of query fields containing the plurality of predetermined IDs, respectively, that identify the sub-collection within the collection;

to identify the sub-collection within the collection using the plurality of predetermined IDs contained in the plurality of query fields, respectively; and to access, from the non-relational database, the respective document of the identified sub-collection on the single partition of the database server.

14. The system of claim 13 wherein the at least one memory of the development client contains a wrapper library having an application programming interface (API) and a plurality of predetermined functions, and wherein the at least one processor of the development client is further operative to execute the at least one computer program out of the at least one memory:

to generate the query for the respective document as an API call to a respective function from among the plurality of predetermined functions of the wrapper library.

15. A computer program product having non-transitory computer readable media that stores at least one set of instructions to implement a non-relational database that makes more efficient use of a limited number of collections within a database storage resource, the at least one set of instructions, when carried out by computerized circuitry, causing the computerized circuitry to perform a method of:

creating a collection of one or more documents in the non-relational database, the collection being created on a single partition of the database server;

creating a plurality of sub-collections within the collection so as to increase storage capacity of the non-relational database without an increase in a limited number of collections of the database storage resource, the plurality of sub-collections being created on the single partition of the database server;

generating a sub-collection identifier (ID) for a sub-collection from among the plurality of sub-collections, the sub-collection including a respective document from among the one or more documents of the collection, the sub-collection ID including a plurality of predetermined identifiers (IDs) that identify the sub-collection from among the plurality of sub-collections;

modifying a format of the respective document to include a plurality of document fields containing the plurality of predetermined IDs, respectively;

receiving a query to access the respective document of the collection, the query including a plurality of query fields containing the plurality of predetermined IDs, respectively, that identify the sub-collection within the collection;

identifying the sub-collection within the collection using the plurality of predetermined IDs contained in the plurality of query fields, respectively; and accessing, from the non-relational database, the respective document of the identified sub-collection on the single partition of the database server.

* * * * *